United States Patent
Vermeire et al.

(10) Patent No.: US 6,874,152 B2
(45) Date of Patent: Mar. 29, 2005

(54) SYSTEM FOR ACCESSING CONTENT BY VIRTUAL REMOTE CONTROL THROUGH MAPPING CHANNEL CODES TO NETWORK ADDRESSES

(75) Inventors: Brian Christopher Vermeire, Santa Monica, CA (US); Jim Sasso, Irvine, CA (US); Lewis Andrew Kurfist, Park Ridge, NJ (US)

(73) Assignee: NOWavision, LLC, Ramsey, NJ (US)

( * ) Notice: Subject to any disclaimer, the term of this patent is extended or adjusted under 35 U.S.C. 154(b) by 407 days.

(21) Appl. No.: 09/820,176

(22) Filed: Mar. 28, 2001

(65) Prior Publication Data

US 2001/0044855 A1 Nov. 22, 2001

Related U.S. Application Data

(60) Provisional application No. 60/198,398, filed on Apr. 19, 2000.

(51) Int. Cl.[7] ............................................... G06F 3/00
(52) U.S. Cl. ..................... 719/330; 709/203; 709/228; 709/229; 719/329
(58) Field of Search ............................... 709/203, 228, 709/229, 310–330; 719/329, 330

(56) References Cited

U.S. PATENT DOCUMENTS

| | | | | |
|---|---|---|---|---|
| 5,706,507 A | * | 1/1998 | Schloss ................. | 707/104.1 |
| 5,893,095 A | * | 4/1999 | Jain et al. ................. | 707/6 |
| 5,945,987 A | * | 8/1999 | Dunn ..................... | 345/718 |
| 5,945,988 A | * | 8/1999 | Williams et al. ........... | 345/747 |
| 5,961,603 A | * | 10/1999 | Kunkel et al. ............. | 709/229 |
| 5,977,964 A | * | 11/1999 | Williams et al. ........... | 345/721 |
| 6,058,430 A | * | 5/2000 | Kaplan ................... | 709/245 |
| 6,115,680 A | * | 9/2000 | Coffee et al. ............. | 702/187 |
| 6,513,069 B1 | * | 1/2003 | Abato et al. ............... | 709/238 |
| 6,515,690 B1 | * | 2/2003 | Back et al. ............... | 345/866 |
| 2003/0056215 A1 | * | 3/2003 | Kanungo ................. | 725/38 |

FOREIGN PATENT DOCUMENTS

EP            001008933 A2 * 11/1999

* cited by examiner

Primary Examiner—Nabil El-Hady
(74) Attorney, Agent, or Firm—Oppenheimer Wolff & Donnelly LLP (57) ABSTRACT

A system for accessing content over a network of computers. The system includes a database system, a content provider interface, a viewer interface, and a virtual remote control. The database system maps channels codes to network addresses as well as to content descriptions. The network address identifies a unit of information or entertainment content. The channel codes include a genre code and a numerical code. The content provider interface assists content providers in entering the network addresses and the content descriptions for their information and entertainment content into the database system. The viewer interface includes a guide (which may be printed or electronic) and a network browser. The viewer interface displays the content descriptions and allows the user to select and view the unit of content on a channel. The virtual remote control is software implemented and allows the viewer to access the channels or to surf through the channels for a given genre. In different embodiments, the viewer can use a microphone, game pad, infra red controller, mouse, keyboard or other computer peripheral, a speech recognition module and speech synthesizer module to control the virtual remote control or the viewer interface.

5 Claims, 5 Drawing Sheets

SYSTEM FOR ACCESSING CONTENT BY VIRTUAL REMOTE CONTROL THROUGH MAPPING CHANNEL CODES TO NETWORK ADDRESSES

CROSS-REFERENCE TO RELATED APPLICATIONS

This application claims the benefit of U.S. Provisional Application No. 60/198,398, filed on Apr. 19, 2000, entitled "Internet Broadcast Channel Select System," which is incorporated herein by reference.

BACKGROUND OF THE INVENTION

The present invention relates to content provided over the Internet and other computer networks and particularly to a system for accessing such content.

As more people are joining the on-line, global, Internet community, the Internet is becoming a major entertainment, education, and information tool. While the mid-1990's were a time for advancements in the speed of traditional phone modem, in the post-year-2000 world, netizens are turning to broadband services for Internet access. Cable companies, such as Time Warner, offer RoadRunner cable-modem subscriptions which give the subscriber access to the Internet at up to 50 times faster than a standard telephone modem. As a competitor to cable-modems, phone companies, such as Qwest and the other 'baby bells,' offer DSL ("digital subscriber line") service which offers always-on Internet access at up to 25 times faster than a standard phone modem. Companies such as Starband are rolling out a 2-way Satellite Internet system to provide Broadband Internet Service to even those in areas too remote to attract other broadband providers. In a recent industry article, it is estimated that there were 5.5 million broadband users in 2000 and this number may rise to 29.6 million by 2004 (PC Magazine, "Broadband at a Glance," Jan. 19, 2001, available on-line through http://www.zdnet.com/pcmag).

The growing base of high-speed Internet subscribers is generating demand for on-line content. An industry of on-line broadcasters already exists and is developing rapidly. These broadcasters are now offering original short movies, multi-episode series, animations, etc. NetRatings data (which is collected by the company which also runs the Nielsen TV ratings system) shows that about 17 million individuals accessed some form of this rich-media content from the Internet in September 2000. Another industry expert, J.P. Morgan Securities, predicts that the market for such digital content will reach $275 billion by 2003.

Today, on-line broadcasting suffers from many problems. Potential viewers remain unaware of the availability of much of the programming. Viewers often use general search engines to find content, but these searches are unfocused. For example, the viewer can't readily find just content that would be classified as science fiction. Although there are some websites calling themselves on-line content guides, the sites are not extensive nor reliable. The viewer must first sift through a large list of possible sites, without much guidance. This searching process may direct the viewer to websites that are simply dead links, websites that do not meet the viewer's requirements, or websites offering substandard, poor, content. Unfortunately, even if the viewer does reach a Website with desirable programming, the viewer may find that his or her PC lacks the correct plug-in software to view the program. This causes much viewer frustration.

Computer users who are sight or physically impaired have special needs for searching and accessing content on-line. URLs can be extraordinarily long and confusing. Even if content is audio-based, sight-impaired users cannot reach such content because current network browsers require sight in order to properly use them.

Broadcasters themselves also must deal with problems of on-line broadcasting. Broadcasters have trouble attracting viewers to their content. There is no simple, standard, or best way to list and advertise their available programming. In addition, broadcasters do not have an accurate way to measure the success of their programming as it is difficult to count the number of viewers and to track their viewing habits. Ironically, the plethora of offerings available on the Web (Internet) prevent potential viewers from finding these sites. And programmers' offerings and their advertisers are failing to find audiences.

The traditional Domain Name System ("DNS") causes problems with Web broadcasting. The DNS relies on long and intricate website names (URL's) making it more difficult for broadcasters to brand their shows. To establish or change a program's domain name assignment can be slow, involving the administrative requirements of one of the authorized Internet registrars and requiring the change to propagate to the multitude of domain name servers.

In addition to the problems faced by viewers and content providers, advertisers of the content encounter similar problems with the existing paradigm; specifically, advertisers are unable to identify which Internet content is attracting their target audiences.

BRIEF SUMMARY OF THE INVENTION

This invention is a system for accessing content from the Internet and other computer networks. In one embodiment, the system includes a database, a content provider interface, and a viewer interface. The database maps channels codes to network addresses as well as to content descriptions. The network address identifies a unit of information or entertainment content. The channel codes include a genre code and a numerical code. The content provider interface assists content providers in entering the network addresses and the content descriptions for their information and entertainment content into the database system. The viewer interface includes a guide (which may be printed and/or electronic), a network browser, and a virtual remote control. The guide displays the content descriptions and the network browser allows the user/viewer view the unit of content on a channel. The virtual remote control allows the viewer to access the channels or to surf through the channels for a given genre. The network browser also incorporates a unique Favorite Channels system that creates a submenu for each genre and automatically assigns each channel the user designates as a favorite to that channel's genre submenu. The Favorite Channels system significantly enhances the user's ability to recall favorite channels.

In some embodiments, the viewer can use a microphone, game pad, infra red controller, mouse, keyboard or other computer peripheral to control the virtual remote control or the network browser of the viewer interface. In some embodiments, only channels associated to units of content are accessible while the viewer surfs through channels. In some embodiments, the viewer can assign channels associated to units of content to the viewer's favorites list.

The present invention offers a system to Internet viewers which allows them to quickly and accurately find relevant on-line programming. Viewers can access on-line content by subject matter to eliminate content which is not topical to their needs. Viewers with visual or other impairments can use the system's speech recognition and speech synthesizer modules to access and play the on-line content. The present invention, in some embodiments, also assists on-line broadcasters and advertisers to accurately track their viewing audience.

BRIEF DESCRIPTION OF THE DRAWINGS

For a more complete understanding of the present invention and its features and advantages, reference is made to the following description taken in conjunction with accompanying drawings, in which.

DETAILED DESCRIPTION OF THE INVENTION

Figure 1:
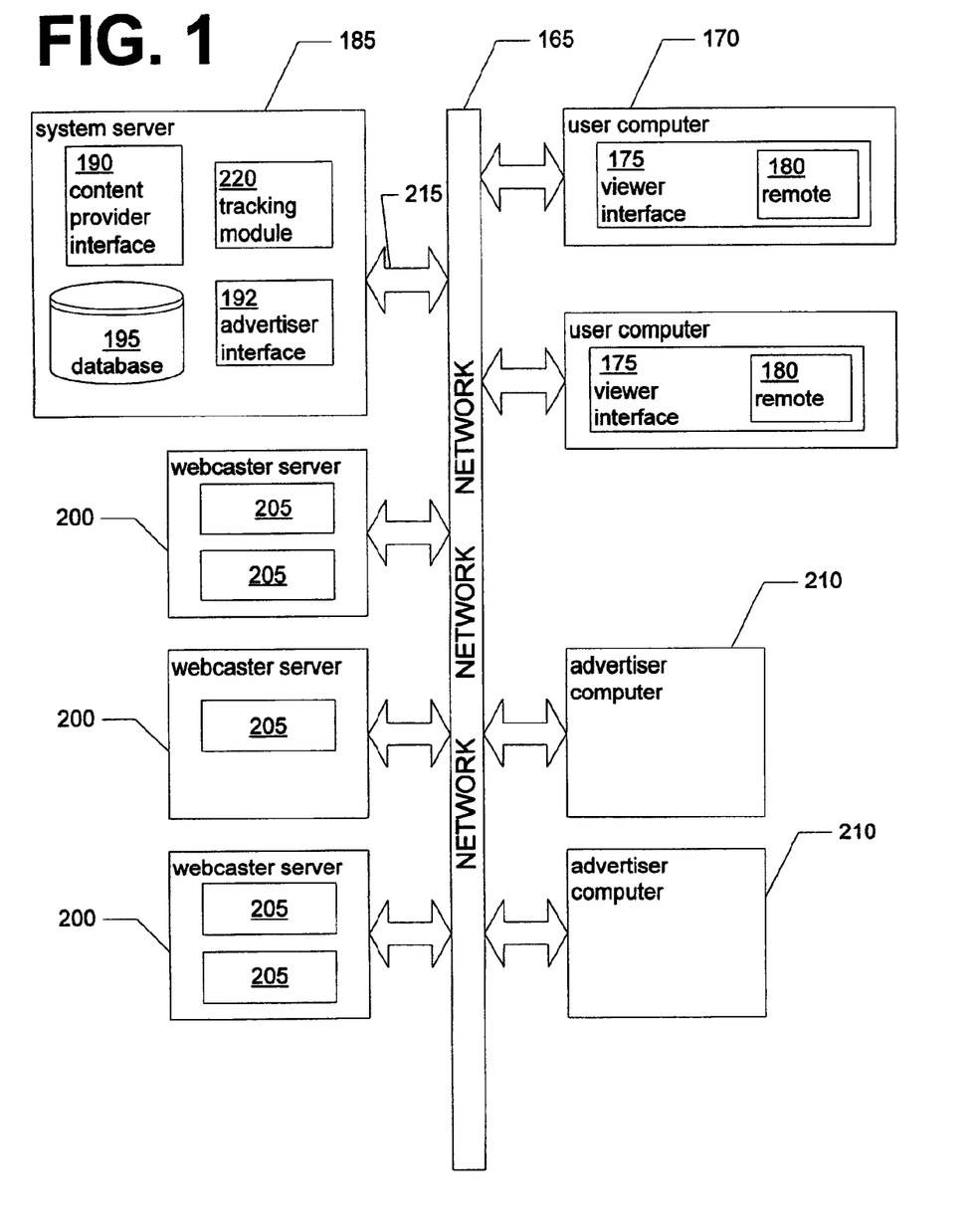
FIG. 1 is a block diagram of one embodiment of the present invention.

The present invention is a system for accessing content. Throughout the drawings, an attempt has been made to label corresponding elements with the same reference numbers. Referring to the drawings, FIG. 1 shows a block diagram of one embodiment of the present invention, which consists of several components interconnected to the Internet or other network 165 via network connections 215. FIG. 1 shows a system server 185 on which a database 195, content provider interface 190, and advertiser interface 192 are loaded. Various on-line broadcasters have units of content stored as content files 205 on their various webcaster servers 200. Through the present invention, a webcaster can access the content provider interface 190 via the Internet 165. The content provider interface 190 is used to create and maintain data in the database 195. The advertiser interface 192 allows advertisers to designate where in the on-line and print guides they would like to insert their ads. The advertiser interface 192 also allows advertisers to upload their advertisements in digital format.

The database 195 includes fields for channel codes, network addresses and content descriptions. The webcaster uses his computer to access the system server 185 to enter information in the database 195 about each of its content files 205, including the IP address (or other network address) of the content files 205 and a content description of each content file 205. The database 195 associates this content information to a channel code. Similarly, advertisers wishing to place ads, can use their computers 210 to access the system server 185, advertiser interface 192, and associated database 195.

PC users can load the viewer interface 175 and virtual remote control software 180 (which displays the virtual remote control interface 100) on their computers 170. In some embodiments of the invention, the viewer interface 175 includes software to allow the user to control the invention via voice commands.

In practice, a content-provider may have a short digital film entitled "The Sci-Fi Chronicles." The content-provider can use the content provider interface 190 to create a record in the database 195 for this program, which includes not only the title, but also a description, such as "Tracing the Roots of Science Fiction Movies." A specific genre and channel code is later assigned to the content file 205. For example, "The Sci-Fi Chronicles" could be assigned to the Science Fiction genre and given the channel code of SF0002. In other embodiments, the administrator of the database 195 manually matches the content file record to a channel code. Because content providers may wish to have their various content files appear on contiguous channels (such as SF0005 through SF0010), or because some content providers may be willing to pay additional fees to receive the lower numbered channels (which may be accessed more often by viewers), the content provider interface 190 may be configured so that the content provider can elect to purchase or "lease" a particular channel or range of channels within one or more genres. Lower channel numbers may be reserved in each genre for "premium" content providers.

The part of the system which allows webcaster content providers to input channel information (such as the IP address of the content files 205 for "the Sci-Fi Chronicles" and a content description) into the database 195, and then generates the channel files and on-line and print guides is also known as the Domain Channel System ("DCS"). While there are other systems in the prior art that collect television data and ultimately pass that data to the consumer's TV channel tuner via the broadcast signal, those systems do not address the needs of PC-based network surfing. The Domain Channel System ("DCS") of the present invention is well suited to meet such needs. The DCS collects content information from the many content providers. Then the DCS assigns the appropriate Genre code and Channel code to each unit of content. The DCS also generates online and paper content guides that are used by the viewers to inform them of the various content files available. The DCS data files are (in one embodiment) text files. Each genre is described by its own data file. At the most basic level, a DCS data file includes each channel's alphanumeric channel code, the IP address of the content files, and the directory path for the content files. For example, the Science Fiction DCS data file could begin with:

SF001
Encounters of the 4th kind
http://216.34.71/4th_kind/
SF002
The Sci-Fi Chronicles
http://216.34.71/chronicles/content/al_visitors.htm
SF003
Sci-Fi Horror Forum
http://208.243.106.152/scifi/scifi.htm
SF004
UFO's Hard Evidence - Vol.5
http://www.ufo.mag.co.uk/Trail.htm In other embodiments, the data files can include more information, such as an age appropriateness rating which would be available to the user by selecting the Information button on the virtual remote control or which could work in connection with a parental locking option and automatically lock out all channels above a certain rating from a child viewer.

Each time that a user runs the viewer interface application, the data files on the user's PC hard drive are compared to the data files available on the system server 185. If the data files on the system server 185 include new channel information, the data files are automatically downloaded to the user's PC, overwriting the previous version of the data files. Alternatively, the user can manually request that the local data files be updated.

It should be noted that the DCS data files are distinct from the online guide 250 available by the system. Although both the data files and the online guide 250 derive their content from the same database 195, and they are both updated to reflect changes to the content, their (1) file formats, (2) purposes, and (3) updating all three differ. In one embodiment, the data files are stored in text file (.TXT) format while the online guide 250 is stored in. CHM format (the compressed HTML file format created by Microsoft as part of the HTML Help system). The purpose of the data file is for the viewer interface 175 to download content files while bypassing the existing domain name system (DNS). As discussed above, DCS data files are updated as necessary each time the viewer interface 175 runs. The online guide 250 is updated independently from the DCS data files.

In one embodiment, Lotus Domino server software is used to access the database 195 and to generate the files needed to produce the online guide 250 and DCS data files. Of course, in other embodiments, other service and database software could be used.

Figure 4:
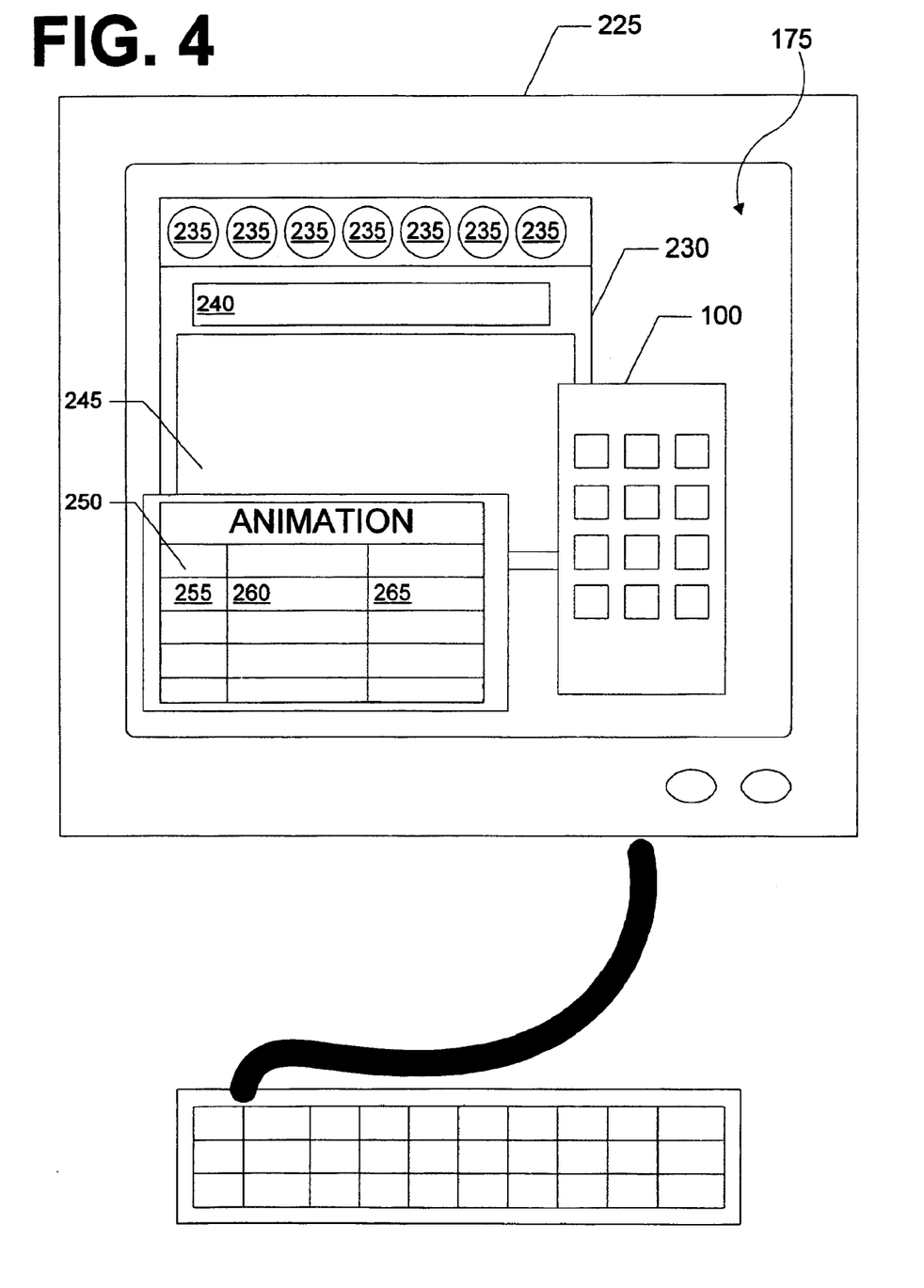
FIG. 4 is a drawing of a user's PC displaying the user interface, virtual remote control and electronic guide.

A PC user can choose to view the content files by establishing a connection to the Internet and running the viewer interface 175, which consists of a network browser 230 as well as printed and/or on-line content guides 250. FIG. 4 shows a PC with a computer monitor 225 displaying one embodiment of the viewer interface 175. In FIG. 4, the network browser 230 includes an area for advertising banners 240 and a main region 245 in which content accessed from the network is displayed. Advertisements appearing in the on-line guide and/or displayed by the network browser 230 can be geared to specific viewer groups based on the demographic information each user provides during a registration process.

The network browser 230 is also set up with toolbar button icons 235. Three of the buttons are similar to those found in most network browsers. The HOME button loads the default webpage and serves as a home base for the viewer. The HELP button loads a help utility that displays a help manual containing detailed instructions on using the guides, toolbar icon buttons, virtual remote control and other features accessible by the user/viewer. The OPTIONS button allows the user to customize certain aspects of the viewer interface 175. For example, the user can use the OPTIONS button to, among other things: (1) select a theme-based appearance of the user interface; (2) enable or disable voice recognition features of the software; (3) enable or disable the helper feature which uses an animated character chosen by the user to explain how the software works and that a user has performed an unrecognized or disallowed function; (4) turn program and/or system sounds on or off; or (5) allow the user to update the online guide and other channel information.

A fourth toolbar button icon 235, labeled 'REMOTE', toggles the display of the virtual remote control interface 100. An important aspect of the present invention is that although the virtual remote control interface 100 is related to the network application browser 230, the two applications operate independently, thus allowing the user/viewer to have both items running on the computer screen simultaneously without interfering with one another. This is advantageous because the virtual remote control 100 does not use space within the network browser application 230. Thus, the network browser application can devote its screen space to displaying content files. In addition, by supporting a virtual remote control 100 that is distinct from the other elements of the viewer interface 175, the user does not have to access or continuously return to a specific, designated content page residing on a remote server to access the virtual remote control 100.

A fifth toolbar button icon 235, labeled 'LISTINGS' toggles the display of a window containing an electronic version of the content guide 250. The content guide 250 can include feature articles as well as channel listings, which may be sorted by genre. For each channel, columns can be set up in the content guide 250 for the channel code 255, content title & content description 260, as well as content file size and other information 265. Other information may include reviews of the program, length of the presentation, a suggested audience rating (such as G, PG, PG13, R, etc.), as well as the format of the content file accessed via the channel, which indicates which plug-in player is used to view the content file. Plug-in players used can include Flash, Pulse, Quicktime, Real Video, Shockwave, and Vivio. In some embodiments, the electronic guide 250 includes a button (that resides in the column for channel code 255) which, when pressed, inserts the appropriate Channel Code into the virtual remote 100 channel readout 105.

A sixth toolbar button icon 235, labeled 'MY CHANNELS', allows the user/viewer to save certain channels as favorites in a favorites list. The MY CHANNELS menu revealed by pressing the MY CHANNELS button 235, provides a number of functions. Submenu items allow the user to add the Channel currently displayed in the main region 245 to his or her lists of favorites. Favorites are organized by genre, each genre represent by a separate sub-menu. When a user uses the "add favorites" feature of the MY CHANNELS menu, the current channel is added in ascending numerical order to the submenu for that channel's genre (unlike the "favorites" button found in current browsers, which merely appends the link to the website to the end of the user's current list of favorites, leaving it to the user to manually organize her favorites lists into categories she must create). Another MY CHANNELS submenu allows the user to delete channels from the favorites list. The user may also save the current channel as a favorite by clicking the add favorites button 160 on the virtual remote control 100.

Once the user/viewer consults the online or print Guide and chooses a show to watch, he or she selects the appropriate channel code (such as "SF0002") through the virtual remote control software 180. Once a channel is selected, the proper content file 205 is downloaded from the network address indicated in the database 195. Because the network address is used, the Internet Domain Name System (DNS) is not relied upon, eliminating one step from the normal download process.

There are several advantages to the invention's database 195, which does not rely on the DNS. First, because a single server within the system routes users to content, the content providers can easily move their content from server to server without incurring the delays inherent in remapping that content on the thousands of servers within the DNS. Content providers simply access the content provider interface 190, which updates the database 195 to reflect any changes in network address for the particular content. Second, because channel codes are resolved to network addresses using the database 195 rather than relying on the numerous central and local DNS servers to resolve a convoluted URL into its assigned network access, access time should be improved. Third, the invention allows a load balancing system to be created that is independent of the DNS system. The database 195 also eliminates the needs for URL's that are easily mistyped or forgotten by users.

The three final toolbar button icons 235 are "RETAKE," "STOP," and "UPDATES." When the content file is being displayed to the user, the RETAKE button can be selected to start the animation or movie from the beginning. The STOP button, stops the Web page (that includes the movie or other content) from being downloaded.

Each time a user runs the viewer interface 175, the viewer interface 175 automatically polls the system server 185 to determine whether or not the user has the most recent channel lists and on-line guide. If the user's files are out-of-date, the most current files are automatically downloaded to that user's computer. The OPTIONS button allows the user to update the channel lists and on-line guide at any time. In addition, the UPDATES button can be used at any time to update the viewer interface software 175 to add new features.

In an alternative embodiment, the viewer interface 175 replaces many of the toolbar button icons 235 with panels that emerge from the sides of the virtual remote control 100. These panels display button icons with similar functionality to that of the toolbar button icons 235. Such an embodiment provides more space for the main region 245.

In yet another embodiment an additional toolbar button icon 235 is provided that, when pressed, allows the user to switch back and forth between the viewer interface 175 and a standard browser application (such as Microsoft's Internet Explorer). Such a button icon 235 allows the user to easily view Internet content that is not assigned a channel through the present invention.

In some embodiments, the system server 185 can include a tracking module 220 which can collect data on the viewers' activities, including how often a user viewed a particular channel, how long a viewer spends at each channel viewed, etc. This information may be combined with demographic data submitted by the viewers to generate marketing analysis data which can be used or sold. In addition to tracking how often a user viewed a particular channel, the tracking module 220 can record how long a viewer spends at each channel that user views. Subject to applicable rules and regulations, in one embodiment of the present invention, each time a user accesses a channel, the date, time and channel address is recorded in a file residing on the user's computer. At the end of the current session or at the beginning of the next session, that stored information, along with the user's demographic profile (a multi-digit number, each digit representing a different item of information about that user including age, area code, income, sex, etc.), is sent to the system server tracking module 220 where it is compiled into aggregated data for internal uses or sale to content providers and advertisers.

The system shown in FIG. 1 can be built using well known pieces of equipment. In one embodiment, the user computers 170 and advertiser computer 210 are Intel-compatible PCs running a Microsoft Windows operating system. The system server 185 and webcaster server 200 can be SUN, IBM, or other brand of computer server. The content files can be files stored in multimedia file formats such as Flash, Windows Media Player, Real Audio, etc. In one embodiment, the network browser 230 is coded in Visual Basic and requires the user to also have Internet Explorer 5.0 (or better) loaded on the computer. In other embodiments, other types of computers and network browsers can be supported. For example, remote control software 180 could be implemented as a Java, Active-X, or other plug-in to Internet Explorer, Netscape Navigator, etc. The network connection 215 can be a cable-modem, DSL, T1 or other connection to the network. FIG. 1 shows a single system server 185 upon which the database 195 and content provider interface 190 are loaded. Of course, the data and programs could readily be spread out over more than one system server 185.

Figure 2:
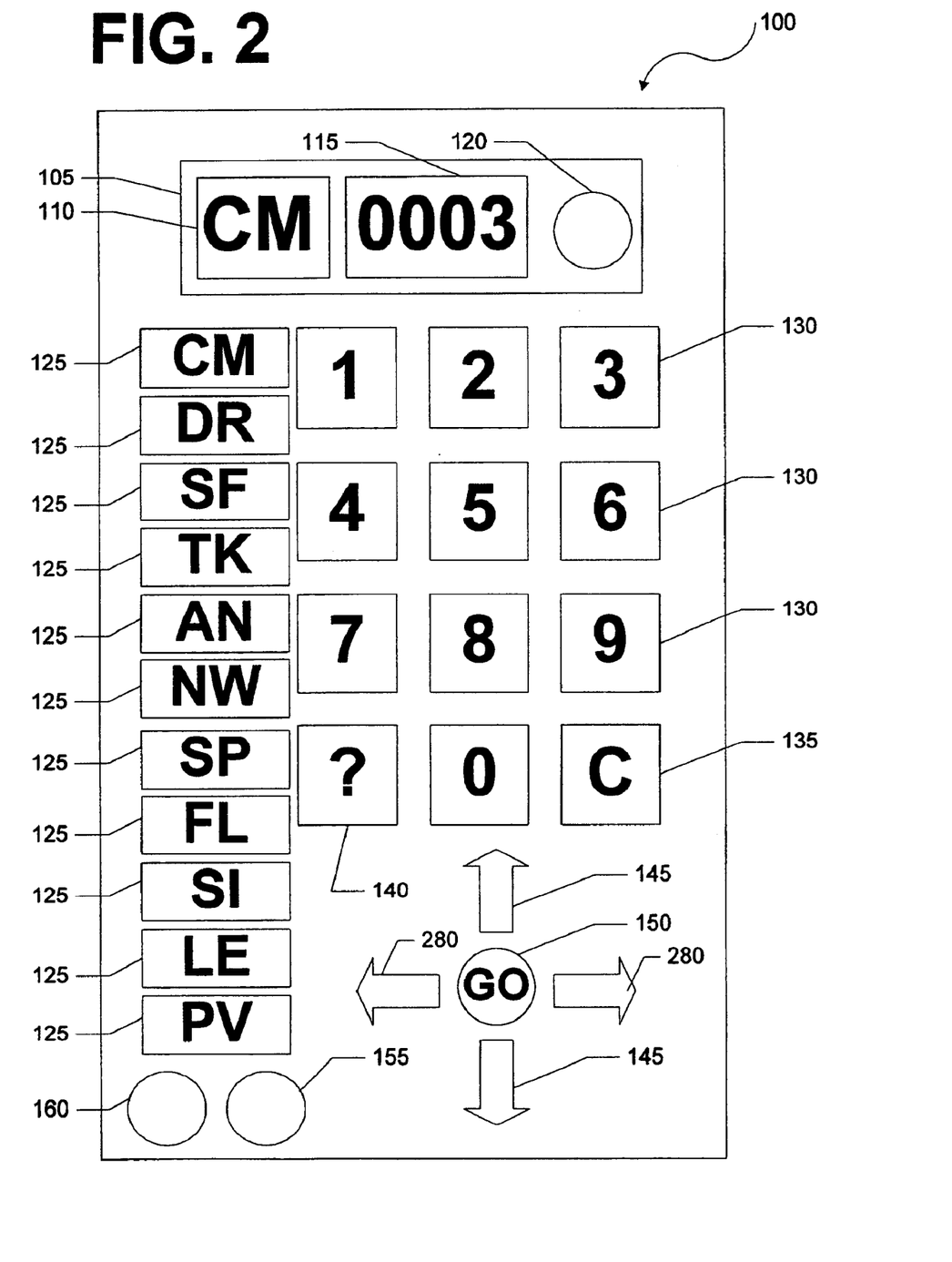
FIG. 2 is a simplified view of one embodiment of the virtual remote control aspect of the present invention.

FIG. 2 shows a simplified drawing of one embodiment of the virtual remote control 100 which is displayed by the virtual remote control software 180. The virtual remote control 100 includes genre code buttons 125 for such genres as comedy, drama, science fiction, sports, and animation, and channel digit buttons 130. One method to select a channel is by entering the proper channel code. To accomplish this, the user/viewer selects one of the genre code buttons 125 and then selects the buttons corresponding to the numeric portion of the channel code. The channel code appears in the channel readout 105. The virtual remote control 100 shown in FIG. 2 has had one of the comedy channels selected because the genre code readout region 110 of the channel readout 105 displays "CM" which is the abbreviation for "comedy" and numeric readout region 115 displays "0003." To access this channel, the user/viewer selects the GO button 150 (or presses the ENTER key on the keyboard) after entering the channel code. Other peripheral devices are also supported—such as game pads. Each peripheral may have additional methods of data entry to initiate a channel change.

If the user attempts to enter a channel code that has not been assigned, in one embodiment, the remote display reverts back to the last valid channel number and the user is informed (verbally and/or textually) that the channel code provided was invalid. The system of the present invention includes a number of these "alerts" explaining when the user has done something not permitted by the system. Examples include entering a channel number before first entering a genre code or trying to surf past the first or last channel in the history list. The system allows the user to designate a "helper", a graphical, interactive character created with Microsoft Agent technology (or similar tool) which will vocalize the alert.

The virtual remote control 100 also includes a "clear" button 135 which allows the user/viewer to erase all or a portion of the channel code already entered. Clicking the clear button 135 erases the rightmost number displayed in the channel readout region 115, shifts the remaining 3 digits to the right, and inserts a 0 into the leftmost position of the channel readout region 115. Double-clicking the clear button 135 sets all four digits in the channel readout region 115 to zero. In either case, no change is made to the genre code readout region 110. However, clicking a genre code button 125 changes the genre code readout region 110 as well as sets the 4 digits in the genre code readout region to "0000."

When the user is on a channel which user has already made a favorite, the Add Favorites Button 160 will glow red. If after downloading, the Add Favorites Button 160 glows green, the user can press that button to add it to his MY CHANNELS.

Figure 5:
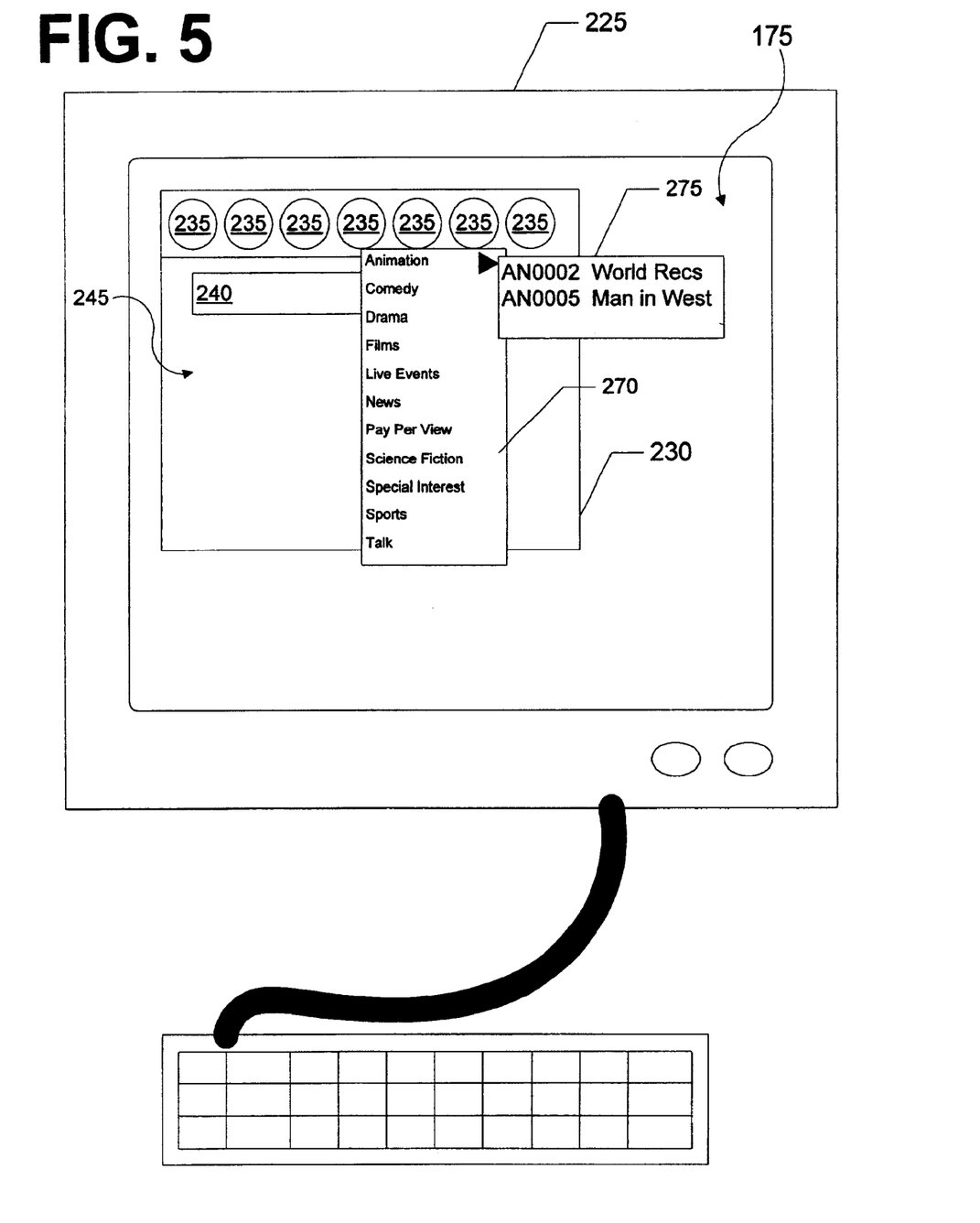
FIG. 5 is a drawing of a user's PC displaying the user interface and the user's favorite list.

The user can also press the MY CHANNELS button on the network browser application to see his or her favorites list 270. This is shown in FIG. 5 as a pull-down window sorted by genre. Each genre has a sublist 275, which displays the user's favorites within the genre. In the example of FIG. 5, the user has set up two favorite animation channels: AN0002 (titled "World Recs") and AN0005 (titled "Man in West"). The favorites list provided by the present invention is superior to other types of listings, such as is provided by Internet browser applications for example, because the channels which are saved to the favorites list are automatically sorted by genre. Other listings are only sorted by channel number. By selecting the Show Favorites button, the user alters the behavior of the up and down arrow buttons 145 so that only channels within that genre that have been designated as favorites will be displayed.

With the present invention, the user does not need to choose a specific channel. As with television, the user can surf through a series of channels by using the scan functions, implemented through the channel direction buttons 145, which appear as an upward pointing arrow and a downward pointing arrow. By selecting the upward arrow, the next higher assigned channel in the genre is selected. For example, in FIG. 2, if the upward pointing arrow button were to be selected, if assigned, the "CM 0004" channel would be displayed; if that channel has not been assigned by the system, the next higher number channel in the Comedy genre that has been assigned will be displayed. Similarly, the downward pointing arrow displays the next lower channel in the genre that has actually been assigned, with one exception. If the current channel is the lowest assigned channel in the genre, the downward pointing arrow will display the highest assigned channel in the genre.

The virtual remote 100 also includes left pointing and right pointing channel history buttons 280. These buttons allow to the user to move forward and backward through the user's history of channels displayed. For example, if the user views content from the "CM 0003" channel, then from the "AN 0002" channel, and then from the "SP 0005" channel, selecting the left pointing arrow button redirects the user to the previous channel watched, which is "AN 0002" in this example. Notice that by contrast to the up and down arrows 145, the right and left arrows 280 not only cross genres, but also are limited as follows: If the current channel is the first channel in the history list for the current session, selecting the left arrow will cause a verbal or written alert that instructs the user that she has reached the beginning of the history list. Similarly, selecting the right arrow when viewing the last channel in the history list will trigger a verbal or written alert to warn the user that she is at the end of the history list. The channel history arrows 280 only access web content that has been assigned a channel by the system. If, for example, the user clicks an advertising banner or a hyperlink that displays a Web page that is not assigned a channel, that Web page is not included in the history list. (However, in some embodiments, the history list may include pages visited during the current session that are not assigned channel codes.)

As described, in most embodiments, the channel direction buttons 145 skip channel codes which do not have assigned content units. In some embodiments, the channel direction buttons 145 can be used to circulate up and down the user's list of favorite channels. One embodiment of the present invention accommodates up to 9999 channels in each genre, though usually not every channel number will be assigned in each genre. When using the up and down arrows to access channels within a particular genre, any unassigned channel numbers are skipped. Of course, other embodiments can accommodate a different number of channels per genre.

Because the system skips unassigned channels, the series of channels within a genre can allow similar content to be organized in ranges. For example, the Sports genre can be organized that so that all professional sports channels appear within the SP0100 to SP0199 channel range. A viewer interested in web channels that address professional sports can "tune into" channel SP0100 and then sequentially access (skipping unassigned channel numbers) each professional sports channel using the up and down arrow buttons. The SF button allows the user further refine his or her channel surfing by accessing only those channels located in the SP0100 band that he or she previously identified as a favorite channel. As previously discussed, the SF button 155 defaults to red, which indicates that the channel surfing arrows surf every assigned channel within the current genre. Clicking the SF button 155 causes the red button to change to green, indicating that the virtual remote has entered Surf Favorite mode so that the up and down arrows will only display those channels in the current genre that the user has added to his MY CHANNELS lists.

At any time, should the user need information, the user information button 140 can be selected to trigger a written or verbal abbreviated summary of the information available in the print and on-line guides for the current channel. There is a separate toolbar button icon 235 on the user interface labeled HELP which displays a Windows help system that describes how to use the system including the guides, the toolbar button icons 235, and the virtual remote control 100.

Because the virtual remote control 100 is generated by software, it can be easily configured differently, using a different layout with a lesser or greater number of buttons. In addition, much like the proliferation of graphical overlay skins (referred to in the current invention as "socks") for popular mp3 players and other multimedia software, the virtual remote control 100 and the viewer interface's network browser 175 can be programmed so that the user can choose from a selection of themes. For example, the virtual remote control 100 as well as the viewer interface's network browser 175 could be customized to use the colors, logos, and appropriate sounds of various professional sport teams, universities, or movies. In one embodiment of the invention, the user can select one of the toolbar icon buttons to access additional socks not installed with the software and click another toolbar icon button to access a submenu listing all of the socks available to the user. Although many users may use the traditional computer mouse to select the buttons found on the virtual remote control 100, the control could be programmed to accept input from other peripheral devices, such as an infra-red controller, keyboard, a joystick, a game pad, a microphone, etc.

Figure 3:
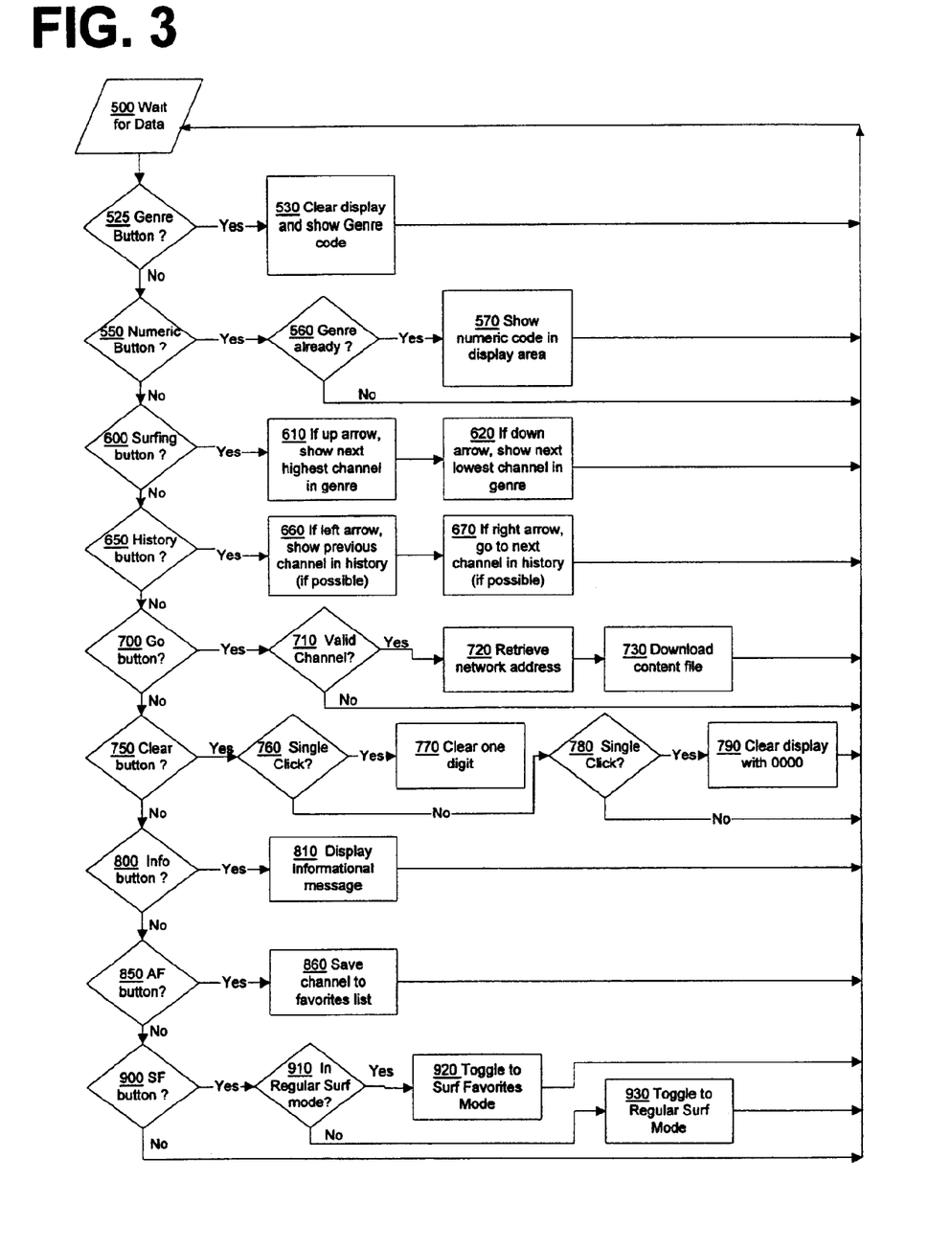
FIG. 3 is a flowchart of one implementation of the virtual remote control.

FIG. 3 is a flowchart detailing the workings of one embodiment of the virtual remote control software 180. FIG. 3 is a designation for the software's "wait state" (step 500) whereby it waits for one of the buttons on the remote (designated as diamonds) to be pressed and then triggers the appropriate response (designated as rectangles), ultimately returning control to the software in its wait state (as indicated by the arrows running right and then up). If the viewer selects one of the genre buttons 125 (step 525), then the channel readout 105 is cleared and the genre code is displayed in the genre code readout region 110 (step 530). If a numeric button is selected (step 550), the software only shows the number in the numeric readout region 115 if a genre code has already been selected (steps 560 and 570).

If one of the two surfing buttons have been selected (step 600), the next highest channel in the genre will be shown if the up arrow was pressed (step 610). The next lowest channel in the genre will be shown if the down arrow was pressed (step 620). These actions are true if the remote is in 'regular surf mode.' However, if the remote has been toggled to 'Surf Favorites' mode (see Steps 900–930, below), then surfing (steps 610 and 620) only shows the next highest or next lowest channel which is in the user's favorites list. As any given channel number may be assigned to as many genres as are available, the remote requires the user to first identify a genre; any number that is thereafter input, whether digit by digit or via the up and down arrows, will access the applicable channel within that genre. If one of the two surfing buttons are selected, but no genre has been entered, a helper or a text box will appear to tell the user that she must first enter a genre.

As has been previously described, the left and right arrows function as history buttons. These buttons display channels in the order they were accessed during the current session, without regard to their genre. For example, if a user's session begins by accessing AN0010, then SP0100, then NW0120, selecting the left arrow once returns the user to SP0100, and a second time to AN0010. Pressing the right arrow key will return the user to SP0100. As the user uses the left and right arrow keys, the destination channel appears in the remote display. The genre of the currently displayed channel dictates which channels will be displayed by then selecting the up and down arrows (for example, in the above example, if the user clicks the left arrow to move from NW0120 to AN0010, clicking the up arrow will display channel AN0011 or whichever is the next highest number assigned within that genre. Thus, in FIG. 3, if one of the two history buttons have been selected (step 650), the viewer will be directed to the previous channel from the history list if the left arrow was pressed (Step 660). If the right arrow was pressed, the viewer is directed to the next channel in the history (Step 670). Of course, if the user is already at one end of the history list, showing either the next or previous channel in the history list is impossible. In such situations, the user is gently reminded with a warning message.

As previously discussed, each time the user runs the viewer interface 175, the software checks to determine whether or not the user has the latest channel files and on-line guide. If not, new versions are automatically downloaded to the user's computer 170. The channel lists, one list created for each genre, are generated by the system servers 185; a new genre channel list is generated whenever there is a change in an entry in the database 195.

In operation of the system, if the user has not entered a genre and channel number higher than 0000, the GO button is not capable of being selected by the user. It is only when the channel readout contains a genre code and a numeric code higher than 0000 and the Status button 120 has changed from red to green, will mousing over the GO button change it from green to yellow indicating that the system is ready to change channels when the go button is pressed. When the GO button is pressed (Step 700), as long as a valid channel has been selected (Step 710), the software consults the appropriate genre channel lists to determine the IP address for the channel entered into the remote (Step 720). The content file 205 at that address is then downloaded and displayed for the viewer (Step 730). However, if the user enters a channel that has not been assigned by the system, the helper or a text box will alert the user that the channel entered is improper, and the numeric readout region will revert to the last valid channel displayed in the channel readout.

If the viewer selects the 'clear' button 135 (Step 750), in one embodiment the channel readout is cleared. In another embodiment, single clicking the clear button 135 shifts the numbers in the channel readout to the right, placing a zero at the leftmost position (Steps 760 and 770); while double clicking changes the numeric readout region to "0000" (Steps 780 and 790). In this embodiment, the clear key 135 does not erase the genre code 110 last entered by the user.

Should the viewer need assistance, he or she can select the user information button 140 (Step 800) will call a channel help module which provides a synopsis of the information available for the current channel, either by providing information for the channel currently on display in the browser area, or (in some embodiments) by providing information on the channel currently displayed in the channel readout even though the user has not clicked go to display that channel (Step 810).

In one embodiment, when the "add favorites" button 160 is red, it indicates that the current channel has already been designated as a favorite. Clicking the AF button 160 when it is green (Step 850) adds the current channel to the appropriate MY CHANNELS genre submenu in ascending numeric order (Step 860). (Alternatively, the user can select the MY CHANNELS toolbar button icon that displays a menu that allows the user to add the current channel to the MY CHANNELS system.)

The viewer's computer 170 can store a favorites list for several different people who use the computer 170. In some embodiments, a total of five users can be supported with five individual favorites lists, each with a different username and password. When each of the five persons run the browser software, he must enter his username/password combination; having done that the browser's user interface reflects that user's themes (skins), favorites channels and other customized features previously selected by that user. The invention also permits the parent to designate whether any of the five users' should be denied access to channels according to their age-appropriate ratings. When the viewer particularly likes the show that is being played, he or she can press the 'add favorites' button 160 (Step 850), information for the current channel will be saved in the favorites list.

The SF (surf favorites) button 155, toggles the Surf Favorites mode on and off—where off means the surfing mode functions regularly. In one embodiment, when the surf favorites button 155 red and it is clicked by the user (Steps 900 and 910), the SF button 155 changes to green, the genre display 110 is cleared, all four numbers in the number display 115 are changed to zero and the operation of the up and down arrow buttons 145 is altered (Step 920). Once a genre code is entered, clicking the up or down arrow will load only channels within that genre that the user has previously identified as a favorite using the add favorites button 150 or the MY CHANNELS menu. If the Surf Favorites mode is already on, selecting that button will toggle it back to regular surfing mode (Step 930).

Of course, FIG. 3 is but one possible implementation of the software for the virtual remote control 100. In one embodiment, the virtual remote control 100 is written as an ActiveX module. However, the software can be written in any language, such as Java, or C++. The software can be adapted to display the virtual remote control 100 in a variety of ways, having a different number of buttons supplied with a different number of functions. The virtual remote control 100 can also be customized to perform different functions depending on the type of information, entertainment or other content being accessed and the nature of the network that stores that content. Examples include, but are not limited to: (i) an Internet telephone package that can use the same headset used to access the virtual remote control via voice command, (ii) a virtual video jukebox dedicated to accessing multimedia music content on the web, and (iii) a virtual radio tuner providing easy access to Internet Radio broadcasts and associated Web or off-Web based information and entertainment related to the music broadcast.

One skilled in the art will appreciate that many variations of the invention can be created. For example, a children's version of the system allows parents to visit a website to designate the only content the child can access. One embodiment presents a web page containing links to approved sites. The parent can either click each link to personally review the site (clicking the appropriate checkbox next to the link if she wants that site added to or excluded from her list of approved web sites) or elect to include every site listed in her families' approved web site. The parent can also create spelling lists, and other options designed to tailor some of the invention's content to her child's specific needs. The virtual remote is simplified to make it easy for children to access the individual sites. One such embodiment uses picture codes to identify math, spelling and other genres and pages featuring well-known commercial logos included within the children only version of the invention.

Another embodiment could combine both an adult version of the software allowing users authorized by the parent to visit any channel while the children's version that restricts users identified by the parent to only those sites approved by the parent within the family's restricted content list.

Another embodiment is an audio version. The remote is reformulated as an audio tuner, which enables users to dial into Internet Radio stations. While such software exists, it typically is a standalone application that provides audio capabilities. This embodiment of the present software uses the browser section to display information (band name, song name, album name, discography, concert tour, fan clubs, web links, etc) pertinent to the song currently playing.

Yet another embodiment is particularly suited for users who are sight impaired or otherwise physically impaired. In this embodiment, the viewer interface 175 may include a speech recognition module to allow the user to control the invention via voice commands, and a speech synthesizer module to allow the viewer interface 175 to respond to the user verbally. As the present invention uses Genre codes rather than complicated URLs to access content on the Internet, surfing for on-line content verbally with the speech recognition module is much easier than in traditional URL-based browsers. The speech recognition module and speech synthesizer module make it possible for sight impaired or physically impaired users to access web material using only their voices.

In such a system, a Braille version of the content guides 250 is used. In this embodiment, the user speaks the genre and channel code. The system loads the content and interacts with the user via voice commands and speech synthesized responses. This system supports alternative web sites targeted to the sight impaired or physically impaired audience. Such sites can be grouped as a single genre, or can receive a signal from a cookie or other means which indicates that the system should switch over from normal mode to speech-assisted mode. This system can be configured so that on-line content which is requested by the user can be translated into verbal form and spoken to the user.

From the foregoing detailed description, it will be evident that there are a number of changes, adaptations and modifications of the present invention which come within the province of those skilled in the art. However, it is intended that all such variations not departing from the spirit of the invention be considered as within the scope thereof.

What is claimed is:

1. A system for organizing and accessing content over a network of computers, the system comprising:

a database system connected to the network that contains a mapping of a plurality of channel codes to a plurality of network addresses and a plurality of content descriptions, where each channel code comprises a textual genre code and a number, and where each network address identifies a unit of content;

a content provider interface to the database system that is connected to the network, for allowing content providers to enter the network addresses and the content descriptions into the database system for the units of content;

a personal computer connected to the network, for use by a computer user to view the units of content over the network; and a viewer interface software that is loaded on the personal computer, the viewer interface comprising a guide and a browser-independent virtual remote control;

wherein the guide shows the content descriptions for units of content and allows a viewer to select one of the channels for viewing in a network browser application running on the personal computer;

wherein the personal computer displays the guide to the computer user independently from the network browser application; and wherein the virtual remote control allows the computer user to display the units of content through the network browser application by inputting a textual genre code and a number or by selecting a textual genre code and then scanning channels by browsing through the channel codes for that genre code;

wherein scanning channels by browsing through the channel codes for a genre code comprises cycling only through the channel codes for which units of content are accessible;

wherein the channel code is not a URL.

2. The system for organizing and accessing content from claim 1, wherein channel scan function of the virtual remote control only cycles through the channels codes which have been identified as one of the user's favorite channels.

3. The system for organizing and accessing content from claim 1, wherein the Internet Domain Name System is not accessed in providing the computer user with units of content.

4. The system for organizing and accessing content from claim 1, wherein the computer user can access units of content with the virtual remote control via a peripheral device, where the peripheral device is one of: a microphone, an infra-red controller for accepting commands from a physical remote control, or a game pad.

5. The system for organizing and accessing content from claim 1, wherein one of the textual genre codes represents units of content chosen by the user.

* * * * *